(12) United States Patent
Carobolante et al.

(10) Patent No.: US 11,719,300 B2
(45) Date of Patent: Aug. 8, 2023

(54) ELASTIC ARTICULATION

(71) Applicant: SUMITOMO RIKO COMPANY LIMITED, Komaki (JP)

(72) Inventors: Pascal Carobolante, Sauvigny-les-bois (FR); Florian Kaszyca, Lucenay-lès-Aix (FR); Frédéric Dupuis, Nevers (FR); Sébastien Sennepin, Dornes (FR); Frédéric Beugnet, Druy-Parigny (FR)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 0 days.

(21) Appl. No.: 17/741,231

(22) Filed: May 10, 2022

(65) Prior Publication Data
US 2022/0364624 A1   Nov. 17, 2022

(30) Foreign Application Priority Data

May 17, 2021   (FR) ........................... 2105136

(51) Int. Cl.
*F16F 1/38*   (2006.01)
*F16F 1/387*   (2006.01)

(52) U.S. Cl.
CPC .......... *F16F 1/3842* (2013.01); *F16F 1/387* (2013.01)

(58) Field of Classification Search
CPC .................... F16F 1/387; F16F 1/3842
See application file for complete search history.

(56) References Cited

U.S. PATENT DOCUMENTS

| | | | |
|---|---|---|---|
| 7,540,478 B2 | 6/2009 | De Fontenay et al. | |
| 9,057,414 B2* | 6/2015 | Kim | F16F 1/38 |
| 11,320,014 B2 | 5/2022 | Gendron et al. | |
| 2017/0355387 A1* | 12/2017 | Otsubo | F16F 1/3828 |
| 2018/0142752 A1* | 5/2018 | Senneff | F16F 1/3842 |
| 2020/0292026 A1* | 9/2020 | Kim | B60K 5/1208 |

FOREIGN PATENT DOCUMENTS

| | | | |
|---|---|---|---|
| DE | 102005020585 A1 | 11/2006 | |
| EP | 0995928 A2 | 4/2000 | |
| EP | 1500828 A1 | 1/2005 | |
| FR | 2830911 A1 | 4/2003 | |
| WO | WO-2009127205 A1 * | 10/2009 | B60G 7/001 |
| WO | 2019202217 A1 | 10/2019 | |

\* cited by examiner

*Primary Examiner* — Melanie Torres Williams
(74) *Attorney, Agent, or Firm* — Kim & Stewart LLP

(57) ABSTRACT

An elastic articulation comprising a first sleeve and a second sleeve is provided. The first sleeve and the second sleeve each include a respective outer armature, a respective inner armature, and a respective elastic body between their respective outer and inner armatures. The elastic articulation also comprises a ring longitudinally connecting the first sleeve and the second sleeve. The ring forms a radial stop between the inner armature and the outer armature of the first sleeve, and between the inner armature and the outer armature of the second sleeve. The elastic articulation improves damping control in different directions.

11 Claims, 16 Drawing Sheets

ELASTIC ARTICULATION

This application is based upon and claims the benefit of priority from French Patent Application No. 2105136, filed May 17, 2021, the entire contents of which are incorporated herein by reference.

The present disclosure relates to the field of elastic articulations.

Elastic articulations may be used to dampen vibrations between two mechanical parts forming part of the same assembly. In particular, such articulations can be used in the automotive sector to connect different mechanical parts of a vehicle, and thus dampen vibrations between the connected parts.

Certain elastic articulations include an inner armature connected to a first mechanical part and an outer armature connected to a second mechanical part, as well as an elastic body between the outer armature and the inner armature. These articulations may have a sleeve shape in which the outer armature surrounds the inner armature around a longitudinal axis of the articulation. The inner armature may further comprise a central longitudinal passage that makes it possible to insert a complementary first mechanical part, in the form of an arm, to connect said mechanical part to the articulation. The outer armature may be connected to a second mechanical part by any means. For example, in a motor vehicle, either the inner or outer armature may be connected to the vehicle engine and the other to the vehicle body. The presence of the elastic body between the outer and inner armatures makes it possible to dampen vibrations between the two mechanical parts.

These elastic articulations can be manufactured by positioning the outer armature around the inner armature, along the longitudinal axis, and forming the elastic body between the two armatures by a molding process. The resulting elastic body is homogeneous, so there is little or no variability in the manner in which the articulation dampens vibrations. There are solutions that make finer control of vibration damping possible, such as by introducing an insert before the molding process, but these solutions typically lead to a complicated manufacturing method.

In this context, there is a need for an improved elastic articulation.

For this, an elastic articulation comprising a first sleeve and a second sleeve is proposed. The first sleeve and the second sleeve each comprise an outer armature, an inner armature, and an elastic body between the outer armature and the inner armature. The elastic articulation also comprises a ring, longitudinally connecting the first sleeve and the second sleeve. The ring forms a radial stop between the inner and outer armatures of the first sleeve, and between the inner and outer armatures of the second sleeve.

The outer armature of the first sleeve and the outer armature of the second sleeve may be press-fitted over the ring and on either side of the ring.

The ring may comprise an elastic inner liner. For example, the elastic inner liner may be a rubber material.

The elastic inner liner may have a radial section of varying shape.

The elastic inner liner may have a variable thickness.

The elastic inner liner may comprise one or more alveoli.

The articulation may further comprise a radial position marker.

The elastic body of the first sleeve and the elastic body of the second sleeve on the one hand, and the elastic inner liner on the other hand, may have different rigidities.

The outer armature of the first sleeve may comprise a notch, and/or the outer armature of the second sleeve may comprise a notch.

The ring may comprise a radial outer protrusion engaging the notch in the outer armature of the first sleeve and/or the notch in the outer armature of the second sleeve.

The ring may comprise a rigid outer wall, of a plastic or metallic material, for example.

Non-limiting examples will be described with reference to the following Figures.

Figure 1:
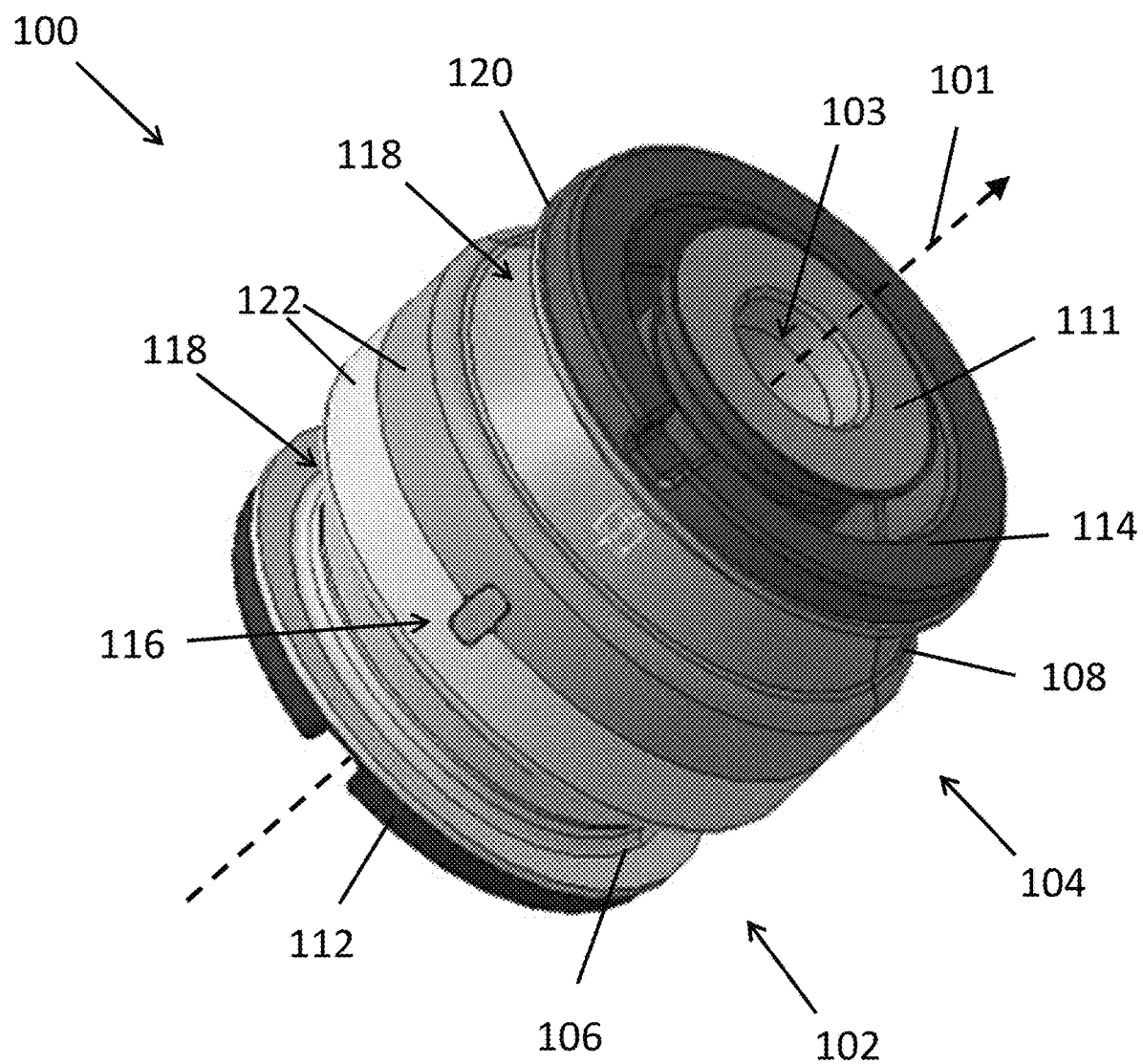
FIG. 1 shows an example of an elastic articulation.

An elastic articulation comprising a first sleeve and a second sleeve is proposed. The first sleeve and the second sleeve each comprise an outer armature, an inner armature, and an elastic body between the outer armature and the inner armature. The elastic articulation also comprises a ring, longitudinally connecting the first sleeve and the second sleeve. The ring forms a radial stop between the inner and outer armatures of the first sleeve, and between the inner and outer armatures of the second sleeve.

This constitutes an improved elastic articulation.

In particular, the ring makes it possible to modulate the vibration damping of the articulation made by the elastic body. Indeed, depending on the mechanical stresses to which the articulation is subjected, there may be radial contact between the inner armature of each sleeve and the ring and/or between the outer armature of each sleeve and the ring. This contact modifies the vibration damping curve of the articulation provided by the elastic body alone. The radial stop formed by the ring therefore makes finer damping possible, resulting in more precise control, by the articulation, of the movement of a vibration and/or its progression, for example.

In other words, the ring makes it possible to modify locally (that is, where the ring is located) the behavior of the elastic articulation in terms of radial vibration damping. The ring is thus an additional variable for adjusting the damping curve. This makes finer damping possible, even if the elastic body is simply made of a homogeneous material (that is, with constant local elasticity). Such homogeneity of the material may in particular result from a conventional process of obtaining the elastic body by a simple molding operation.

In addition, the fact that the articulation comprises two sleeves facilitates the manufacture of the articulation. Indeed, each sleeve can be manufactured separately, which makes greater structural articulation complexity possible, and in particular to provide for ring integration. However, the manufacturing remains simple, since the elastic articulation assembly can be performed easily by connection to the ring of each sleeve. The ring thus makes damping possible, with moderate complexity in terms of manufacturing the elastic articulation.

The ring connects the first and second sleeve longitudinally. This means that the ring links the first and second sleeve longitudinally, that is, it assembles the first and second sleeve along the longitudinal axis.

The elastic articulation can be used to connect mechanical parts of a vehicle. The vehicle may be any type of land, marine, and/or air vehicle, such as a car. The elastic armature may be mounted between two mechanical parts of the vehicle. For example, in the case of a car, the elastic articulation may be mounted to mechanical parts connected to the chassis and body of the car, or to the engine and body.

For this, the elastic articulation has a general sleeve shape resulting from the connection of the two sleeves by the ring, wherein, for each sleeve, the outer armature surrounds the inner armature around a longitudinal axis of the articulation. Each inner armature may further comprise a central longitudinal passage, allowing the insertion of a first complementary arm-shaped mechanical part into the inner armature of each sleeve, in order to connect said mechanical part to the articulation. The outer armatures can be connected to a second mechanical part. For example, the second mechanical part can be assembled around the outer armature of both sleeves. The elastic articulation thus makes it possible to connect the first and second mechanical parts with vibration damping between these parts.

The inner and outer armatures may be generally cylindrical in shape. The armatures may be made of a rigid material. As an example, the inner armatures may be of aluminum or steel, and/or the outer armatures may be of steel or plastic.

The outer armatures may comprise a specifically shaped inner surface comprising a constriction formed between a ring and a plate. The constriction makes it possible to regulate the axial radial stiffness ratio. The outer armatures may comprise a straight or specifically shaped outer surface, parallel to the inner surface.

The ring may be generally cylindrical/annular in shape. The connection may be made by the ring by inserting the ring between the inner and outer armatures of each sleeve. The ring may thus keep the first and second sleeves mechanically connected/linked to each other.

The radial stop is a mechanical stop during the relative radial movement of the inner and outer armatures of each sleeve, that is, the presence of the ring makes a stop when the inner and outer armatures move relative to each other in the radial direction.

The outer armature of the first sleeve and the outer armature of the second sleeve can be press-fitted by force over the ring and on either side of the ring. In this case, the ring remains generally stationary relative to the outer armatures of the sleeves when the elastic articulation is subjected to radial vibration, and the ring thus forms a radial stop for the inner armatures. Alternatively, the inner armatures of the sleeves can be inserted by force into the ring and on either side of the ring. In this case, the ring forms a radial stop for the outer armatures.

The press-fitting by force facilitates the assembly of the elastic articulation. Indeed, the press-fitting makes it possible to assemble the elastic articulation simply, without using a specific assembly method such as stamping or crimping, and/or without using a swaging operation. The press-fitting by force results in a sufficiently strong connection between the two sleeves, without the need for these assembly methods. The elastic articulation can thus be assembled by a simple pressing/forcing operation.

For example, the diameter of the outer surface of the ring may be slightly larger than the diameter of the inner surface of the outer armature of each sleeve (e.g., a few tenths of a millimeter to a few millimeters, depending on the material of the parts). Press-fitting by force can therefore cause the ring to be deformed by its compression. Thus, each sleeve can be held in place by the frictional forces caused by this compression of the ring when each sleeve is press-fitted by force onto it. The edge of each circular end of the ring may be rounded (chamfered) to facilitate press-fitting by force. The rounding may be oriented outward in relation to the longitudinal axis of the articulation.

The ring may comprise an elastic inner liner. For example, the elastic inner liner may be made of a rubber material. The elastic inner liner improves damping control at the stop.

The elastic body of the first sleeve and the elastic body of the second sleeve on the one hand, and the elastic inner liner on the other hand, may have different rigidities.

The difference in rigidity between the elastic bodies of the sleeves and the elastic inner liner make it possible to further refine the damping control. Indeed, it make it possible to play with the rigidities of each elastic part, in order to better control the response curves in the different articulation directions. On the one hand, the elastic bodies of the sleeves contribute to the linear stiffness around the original articulation position, in the linear part. On the other hand, the geometry and the nature of the material of the elastic inner lining contribute to having a progression and a final saturation of the articulation, in addition to that of the elastic bodies of the sleeves. The original articulation position corresponds to the articulation position when no force is applied to the sleeve, that is, when the articulation is at rest, and each armature is centered and aligned on the longitudinal axis. The stiffness of the elastic bodies thus makes it possible to respond to the stiffness around the original, and the stiffness of the elastic inner liner makes it possible to construct a progression curve. The difference in rigidity between the elastic bodies of the sleeves and the elastic inner liner thus makes it possible to tune the articulation damping precisely.

The articulation may exhibit different elastic behavior along the radial direction. For example, the elastic inner liner may have a radial section of variable shape, in particular a variable thickness. This makes it possible to further refine the damping control, along the radial direction here.

Each sleeve may comprise a respective radial position marker, and the ring may comprise a radial position marker. This makes it possible to orient the ring precisely relative to the sleeves, in a radial position. For example, the ring may comprise a protrusion, being inserted into respective notches in the sleeves. This secures the relative radial positioning. The notches may be made on the outer armatures of the sleeves. In the case where the articulation has a differentiated elastic behavior depending on the radial direction, these radial position markers make it possible to position the articulation according to the desired behavior depending on the radial direction.

Alternatively or additionally, the articulation may comprise one or more (e.g. additional) radial position markers. This makes it possible to orient the elastic part in the mechanical assembly. In the case where the articulation has a different elastic behavior, depending on the radial direction, this makes it possible to position the articulation according to the desired behavior depending on the radial direction.

In particular, the articulation may comprise one or more notches, such as a notch at each end of the articulation, made on the elastic body of each sleeve forming said end, for example. Such notches secure the radial positioning of the articulation in relation to the mechanical assembly.

A method for manufacturing such an elastic articulation is also proposed. The manufacturing method comprises providing the first sleeve, the second sleeve and the ring. The manufacturing method also comprises the ring connecting the first and second sleeve longitudinally, such that the ring forms a radial stop between the inner and outer armatures of the first sleeve, and between the inner and outer armatures of the second sleeve.

The longitudinal connection of the first and second sleeve by the ring may be done by press-fitting the first and second sleeve by force with the ring, respectively on either side of the ring. For example, the manufacturing method may comprise the press-fitting by force of the first sleeve over the ring on one side, and the comprise the press-fitting by force of the second sleeve over the ring on the other side. The manufacturing method can be followed directly by a process of assembling a first mechanical part and a second mechanical part with the elastic articulation. This process may follow the manufacturing method without any steps modifying the elastic articulation structurally between the press-fitting by force of sleeves on the ring, and, in particular, without crimping the elastic articulation.

The method may comprise prefabricating each sleeve, including the steps of: providing respective inner and outer armatures, surrounding the inner armature with the outer armature, and then molding the elastic body between the two armatures (possibly using one or more removable inserts and/or one or more non-removable inserts). The molding may include a vulcanization operation, that is, a vulcanization agent may be incorporated into the molded elastomer so as to form the elastic body.

Optionally, the molding of the elastic body may further comprise an adhesion of the inner and/or outer armatures. In other words, molding the elastic body may comprise a pre-treatment of the outer surface of the inner armature and/or the inner surface of the outer armature for each sleeve, prior to molding, the pre-treatment comprising bonding the inner and/or outer armatures with specific adhesives. The adhesion makes it possible to create links between the armatures and the elastic body during the vulcanization that takes place during molding.

Examples of the elastic articulation will now be given with reference to FIGS. 1 to 16.

FIG. 1 shows an elastic articulation 100 that comprises a first sleeve 102 and a second sleeve 104. The first sleeve 102 includes an outer armature 106 (adhered or not), an inner armature 110 (adhered or not, and not visible here but shown in the following FIG. 2), and an elastic body 112 between the outer armature 106 and the inner armature. Similarly, the second sleeve 104 comprises an outer armature 108 (adhered or not), an inner armature 111 (adhered or not), and an elastic body 114 between the outer armature and the inner armature 111. The two sleeves are identical, and for each sleeve, the outer armature surrounds the inner armature around a longitudinal axis 101 of the articulation. Each inner armature further comprises a central longitudinal passage 103, of generally cylindrical shape, for example, making it possible to insert a first complementary mechanical part in the form of an arm, in order to connect said mechanical part to the articulation. The outer armatures, in turn, may be connected to a second mechanical part.

The inner surface of each outer armature may comprise a constriction 118 formed between a ring 120 and a plate 122. The plate 122 may be formed, on the inner surface, by a portion, along the longitudinal axis, with a circular section of constant diameter, and the ring 120, by a portion with a shorter circular section of constant diameter. The constriction 118, in turn, may be formed on the inner surface by a circular section of diameter narrowing and then enlarging from the plate 120 to the ring 120. The constrictions 118 of each outer armature make it possible to regulate the radial and axial stiffness of the articulation to be adjusted, including the radial and axial stiffness ratio.

The articulation 100 comprises a radial position marker 116 formed by a notch on each sleeve, which will be described in more detail in the following Figures. The inner armatures 110, 111 may be aluminum or steel. The outer armatures 106, 108 may be steel or plastic.

As shown in FIG. 1, the elastic articulation 100 is generally symmetrical around a plane transverse to the longitudinal axis 101. In particular, the first sleeve 102 and the second sleeve may be identical and simply arranged symmetrically opposite each other during assembly. In the following, explanations are given for the first sleeve 102, but these explanations may apply identically to the second sleeve 104.

Figure 2:
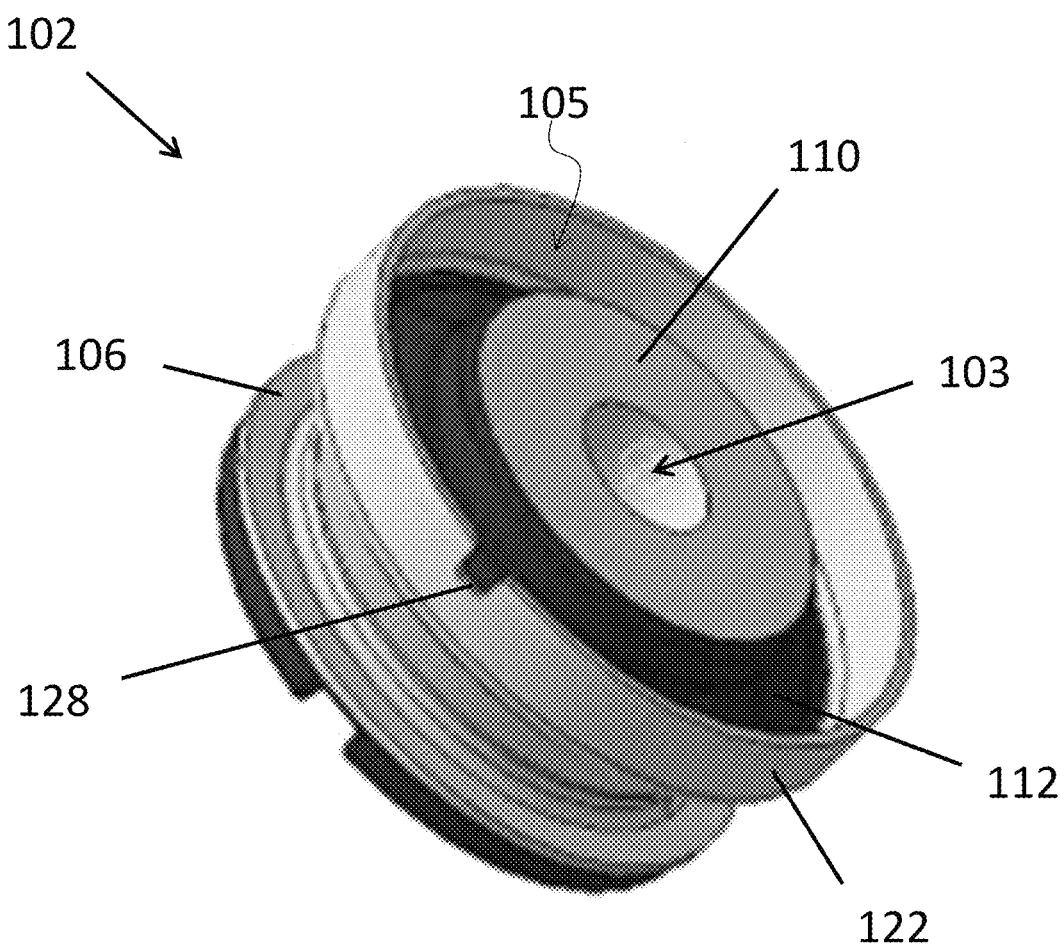
FIG. 2 shows the first sleeve of the elastic articulation of FIG. 1.

FIG. 2 shows the first sleeve 102 of the elastic articulation 100 of FIG. 1. The outer armature 106, the inner armature 110, and the elastic body 112 form a circumferential cavity 105 between them, suitable for receiving the ring during assembly (by pushing the ring in, that is, press-fitting the sleeve 102 by force over the ring).

The outer armature 106 has an outer wall parallel to the inner wall forming the plate 122. At the connection location, the outer armature has a circular end and the inner armature has a generally disc-shaped end. The ends of the outer armature and the inner armature lie in the same plane, transversal to the longitudinal axis, so that they come to rest on the ends of the armatures of the second sleeve when the articulation is assembled.

The outer armature 106 of the first sleeve 102 comprises a notch 128. The outer armature of the second sleeve comprises an identical notch (see FIG. 1). The notches are used as markers when assembling the articulation.

Figure 3:
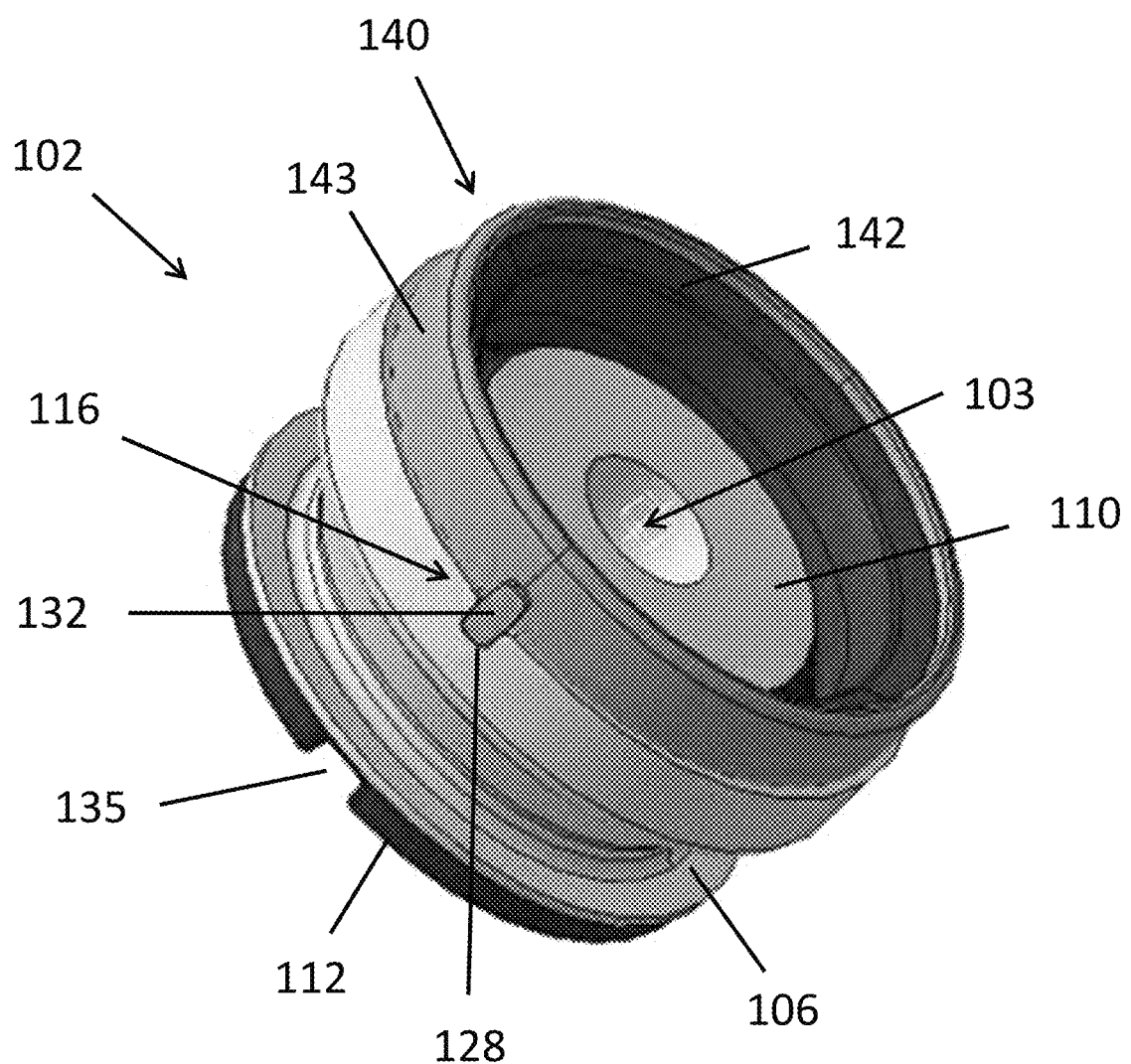
FIG. 3 shows the first sleeve of the elastic articulation of FIG. 1 after press-fitting by force over the ring.

FIG. 3 shows the first sleeve 102 after press-fitting by force over a ring 140. The outer armature 106 of the first sleeve 102 is press-fitted by force over the ring 140 on one side of it. Similarly, the outer armature 108 of the second sleeve 104 can be press-fitted over the ring 140 on the other side of it (see FIG. 1). The ring 140 can thus connect the first sleeve 102 and the second sleeve 104 longitudinally.

The ring inserts itself into the circumferential gap formed between the outer armature 106, the inner armature 110 and the elastic body 112. The ring is thus located between the inner and outer armatures after assembly of the articulation. The ring 140 thus forms a radial stop between the inner armature 110 and the outer armature 106 of the first sleeve 102, in particular a radial stop for the inner armatures 110, 111.

The ring 140 comprises an elastic inner liner 142. The elastic inner liner 142 may be made of a rubber material. The elastic inner liner 142 improves damping control as it makes modulation of damping possible during the stop. The elastic inner liner may be overmolded on the ring, by an adhesion method for example. The rubber can be pre-compressed. This avoids tension due to the expansion of the rubber when cooling down. The press-fitting force can be higher than the resilience of the rubber. The clamping force to press each sleeve onto the ring may be sufficiently strong.

The ring 140 also comprises an outer wall of substantially rigid material 143 (while still permitting press-fitting by force). The outer wall 143 may be made of a plastic or metal material.

FIG. 3 shows the radial position marker 116 shown with reference to FIG. 1 that makes it possible to orient the ring 140 relative to the second sleeve during press-fitting by force. This makes it possible to precisely control of the orientation of the elastic articulation when assembled with mechanical parts.

The radial position marker 116 is in this example formed by a notch 130 on the outer armature 106 and a radial outward protrusion 132 of the ring 140. The radially outward protrusion 132 of the ring 140 engages the notch 130 on the outer armature 106 during the press-fitting (and similarly engages the notch on the outer armature 108 of the second sleeve 104). This secures the radial positioning of the ring relative to the sleeves. Alternatively, the ring and/or sleeves may comprise any other radial position marker, such as a longitudinal line drawn in ink.

Figure 4:
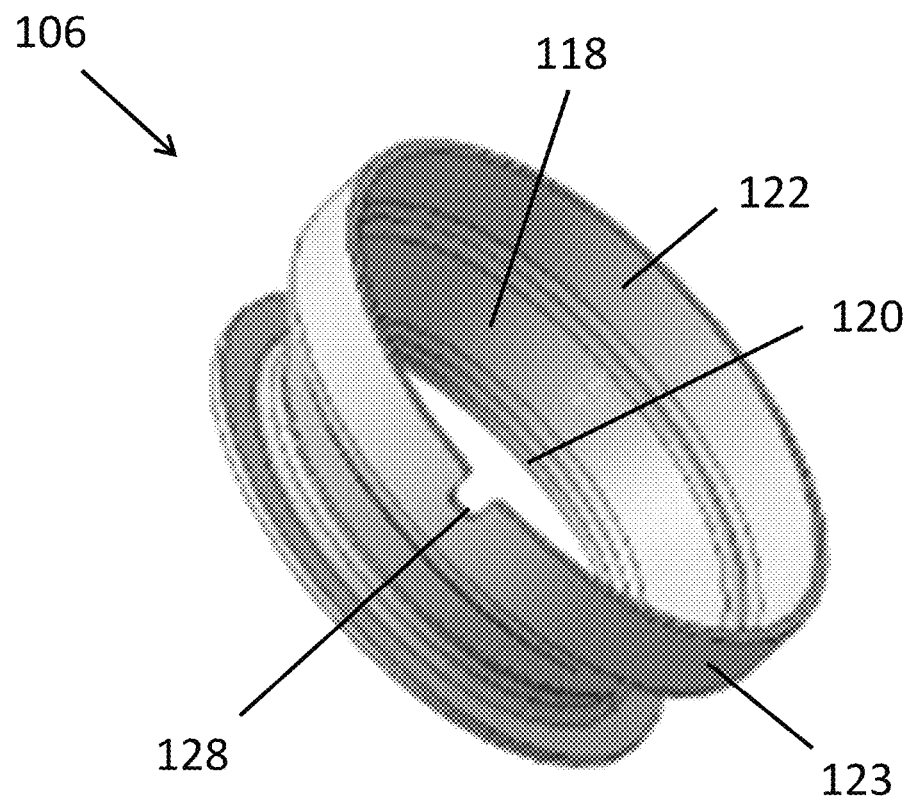
FIG. 4 shows the outer armature of the first sleeve of FIG. 1.

FIG. 4 shows an isolated view of the outer armature 106 of the first sleeve. It can be seen in the Figure that the inner surface of the outer armature 106 comprises a specific shape, comprising the constriction 118 formed between the ring 120 and the plate 122. The constriction 118 on the inner surface makes it possible to regulate the axial radial stiffness ratio. In this example, the outer armature 106 has an outer surface 123 that is also specifically shaped and parallel to its inner surface at the plate 122, but also at the ring 120 and the constriction 118. In other examples, the outer armature 106 may have a straight outer surface and a specifically shaped inner surface. In still other examples, conversely, the outer armature 106 may have a specifically shaped outer surface and a straight inner surface. In general, any shape of outer armature 106 may be used. The outer armature 106 may have a suitable shape that makes it possible to regulate the axial and radial stiffness ratio, that is, to achieve a desired axial to radial stiffness ratio in the articulation.

Figure 5:
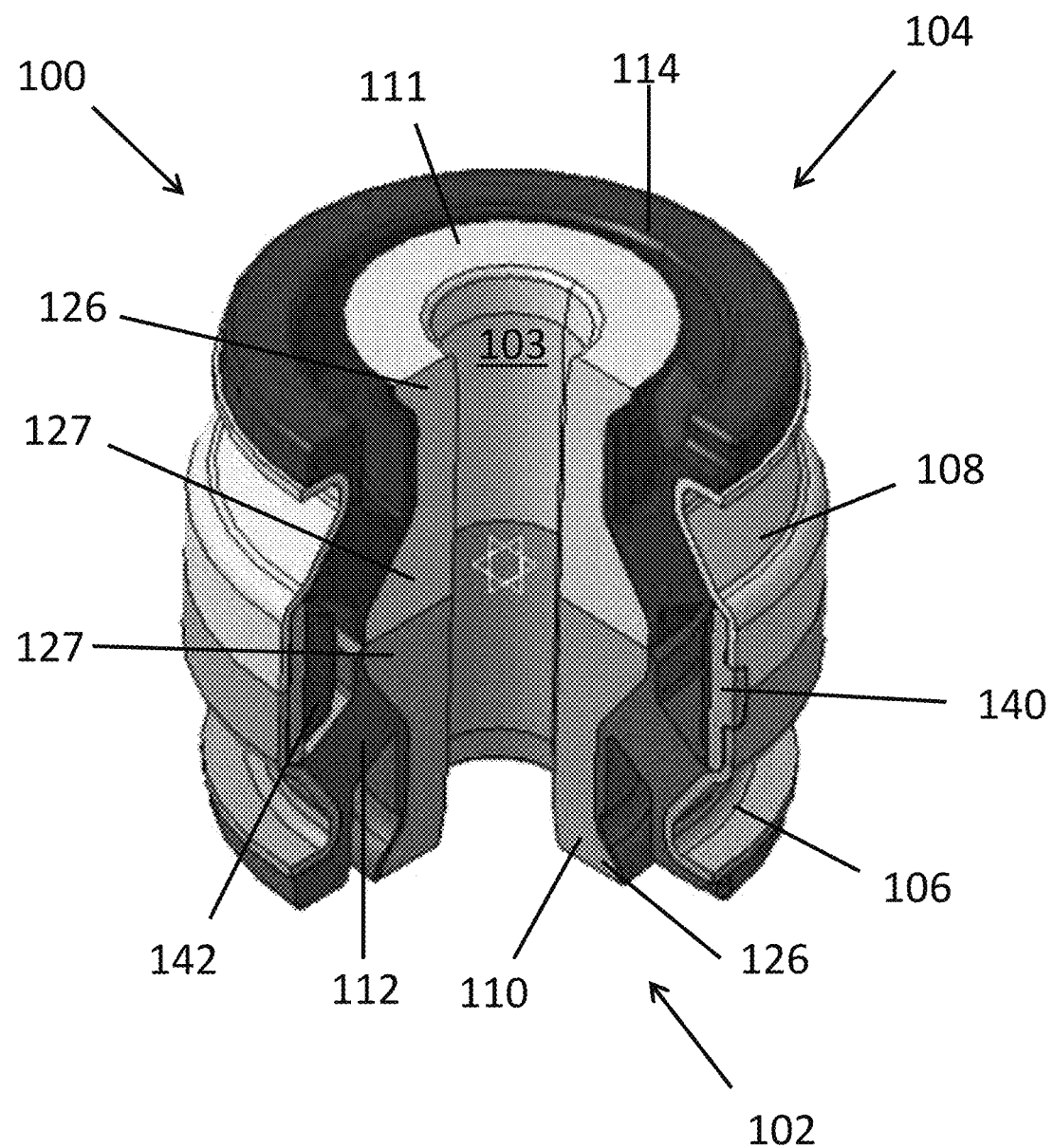
FIG. 5 shows a view of a longitudinal half section of the elastic articulation of FIG. 1.

FIG. 5 shows a view of a longitudinal half section of the elastic articulation 100. The inner armatures 110, 111 include a generally cylindrical inner surface forming the central passage 103.

The ring 140 forms a radial stop between the inner armature 110 and the outer armature 106 of the first sleeve 102, and between the inner armature 111 and the outer armature 108 of the second sleeve 104. In particular, the ends 127 of the inner armatures 110, 111 abut the elastic inner liner 142 radially as the outer armatures 106, 108 move relative to the inner armatures 110, 111 due to vibration. The ends 127 may be coated with a layer of elastic body 112, 114, at least partially around their circumference, so that the stop against the ring 140 may be made through the elastic body 112, 114.

The radial stop against the ring 140 makes it possible to modulate the damping made by the elastic articulation 100. In particular, the elastic inner liner 142 may have different characteristics than the elastic body 112, 114. For example, the elastic inner liner 142 may be made of a different material, have a particular geometry, and/or have a different elasticity. Thus, the ring 140 improves the damping control of the elastic articulation by introducing an additional damping adjustment variable.

Figure 6:
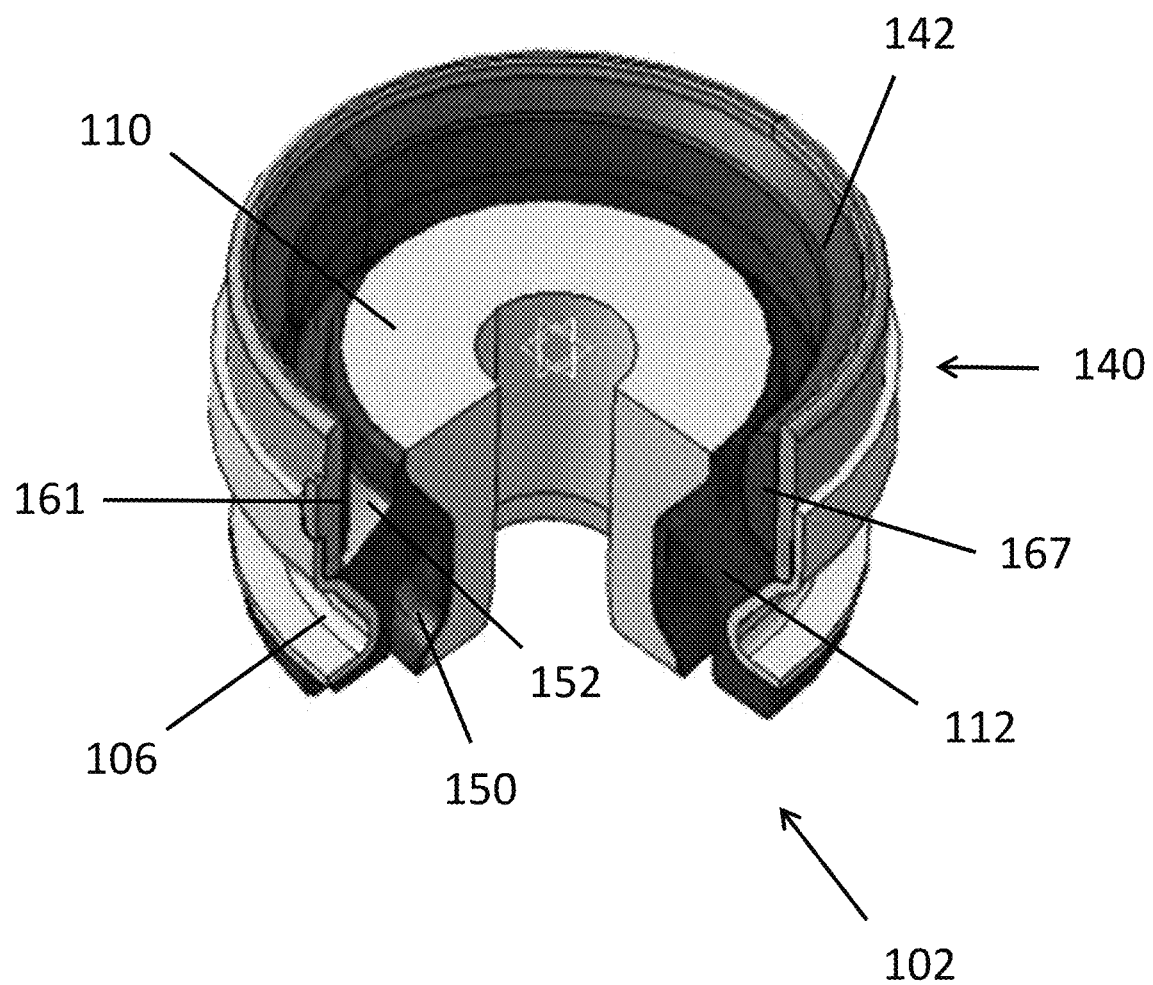
FIG. 6 shows the first sleeve after press-fitting by force over the ring according to the half section of FIG. 5.

FIG. 6 shows the first sleeve 102 after press-fitting by force over the ring 140 according to the half section of FIG. 5.

The elastic body 112 of the first sleeve 102 comprises a first circumferential cavity 150 extending longitudinally from the end of the first sleeve opposite the interface with the second sleeve. The first cavity 150 makes it possible to locally modulate the damping provided by the elastic body 112.

The elastic body 112 of the first sleeve 102 also comprises a bevel from the other end of the first sleeve, that is, the end forming the interface with the second sleeve, the bevel extending longitudinally toward the periphery of the sleeve, and forming a second circumferential cavity 152 (radially) facing the ring 140. The second cavity 152 makes it possible to locally modulate the damping provided by the elastic body 112. In addition, the second cavity 152 forms a space making it possible to accommodate the ring 140 and its liner 142.

As shown in the Figure, the second cavity 152 may be sized to leave a space between the elastic inner liner 142 and the inner armature 110 when the outer armature 106 is pressed into the ring 140. This gap may be sized to interact with the liner 142 and the elastic body 112, 114 to achieve different behaviors in terms of damping.

Furthermore, the space ensures that there is no contact/friction in any direction around the origin, that is, around the position assumed by the articulation at rest, when no outer force is applied to the armatures. This also contributes to improved damping control.

As can also be seen in the Figure, the elastic inner liner 142 may have a radial section of varying shape. In particular, the elastic inner liner 142 may have a variable thickness (in the radial direction). In particular, the elastic inner liner 142 in the example has a thickness that increases continuously at least from a first (thinner) radial section 161 and at least toward a second (thicker) radial section 167. This thickness variation makes variable damping control possible, depending on the radial position. Thus, the elastic articulation makes it possible to control movement and its progression in each direction, independently.

In this case, the visual marker makes it possible to position the articulation 100 radially between the two mechanical parts to be connected, so as to take account of this differentiation in damping depending on the radial position.

Figure 7:
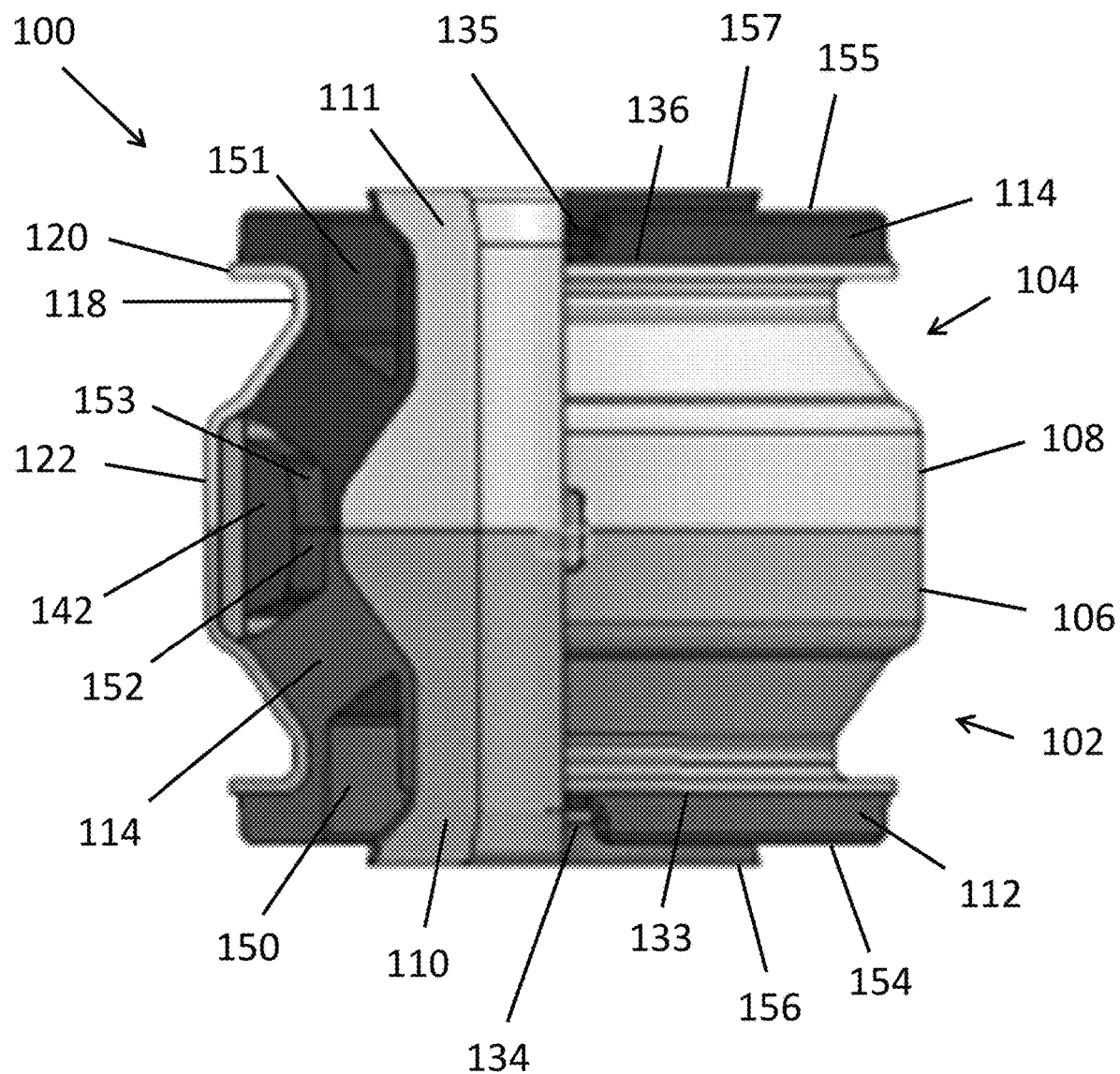
FIG. 7 shows a view in a longitudinal plane of the elastic articulation according to the half section of FIG. 5.

FIG. 7 shows a view in a longitudinal plane of the elastic articulation 100 according to the half section of FIG. 5. The elastic body 112 of the first sleeve 102 overlies an end surface 133 of the outer armature 106. The elastic body 112 overlies the end surface 133 so as to create a space along the longitudinal axis, between an outer surface 154 of the elastic body and an end surface 156 of the inner armature 110. Symmetrically for the second sleeve 104, the elastic body 114 overlaps an end surface 136 of the outer armature 108 so as to create a space along the longitudinal axis, between an outer surface 155 of the elastic body and an end surface 157 of the inner armature 111. These spaces make it possible to adjust the damping along the longitudinal axis of the elastic articulation.

Each elastic body comprises a respective notch 134, 135 on its respective end 133, 134 opposite the connecting interface between the two sleeves. The notches 134, 135 are aligned with the radial outer protrusion of the ring. The notches 134, 135 make insertion of a protrusion of a mechanical part possible, thereby facilitating the assembly of the articulation with this mechanical part. In particular, the notches 134, 135 thereby ensure that the articulation is oriented in the correct direction when assembled in a vehicle, so that the damping control in the various radial directions is as desired between the two mechanical parts that the articulation assembles. The notches 134, 135 make it possible to have a materialized orientation, so that the characteristics of the articulation are oriented in the desired directions. This makes it possible to account for the independent nature of each radial direction in relation to the progression. In this example, the notches are aligned with the radial outer protrusion of the ring. In other examples, the notches and/or the radial outer protrusion may be oriented differently. The sleeves may comprise any other radial position marker, in addition or alternatively to the notches 134, 135.

Symmetrically to what was discussed for the elastic body 112 with reference to FIG. 6, the elastic body 114 comprises a first cavity 151 at a first end of the articulation and a second cavity 153 at the connection to the first sleeve 102. When the outer armatures 106, 108 of the first and second sleeves 102, 104 are slipped over the ring 140, the second cavities 152, 153 make a space between the elastic inner lining 142 of the ring 140 and the inner armatures 110, 111.

Figure 8:
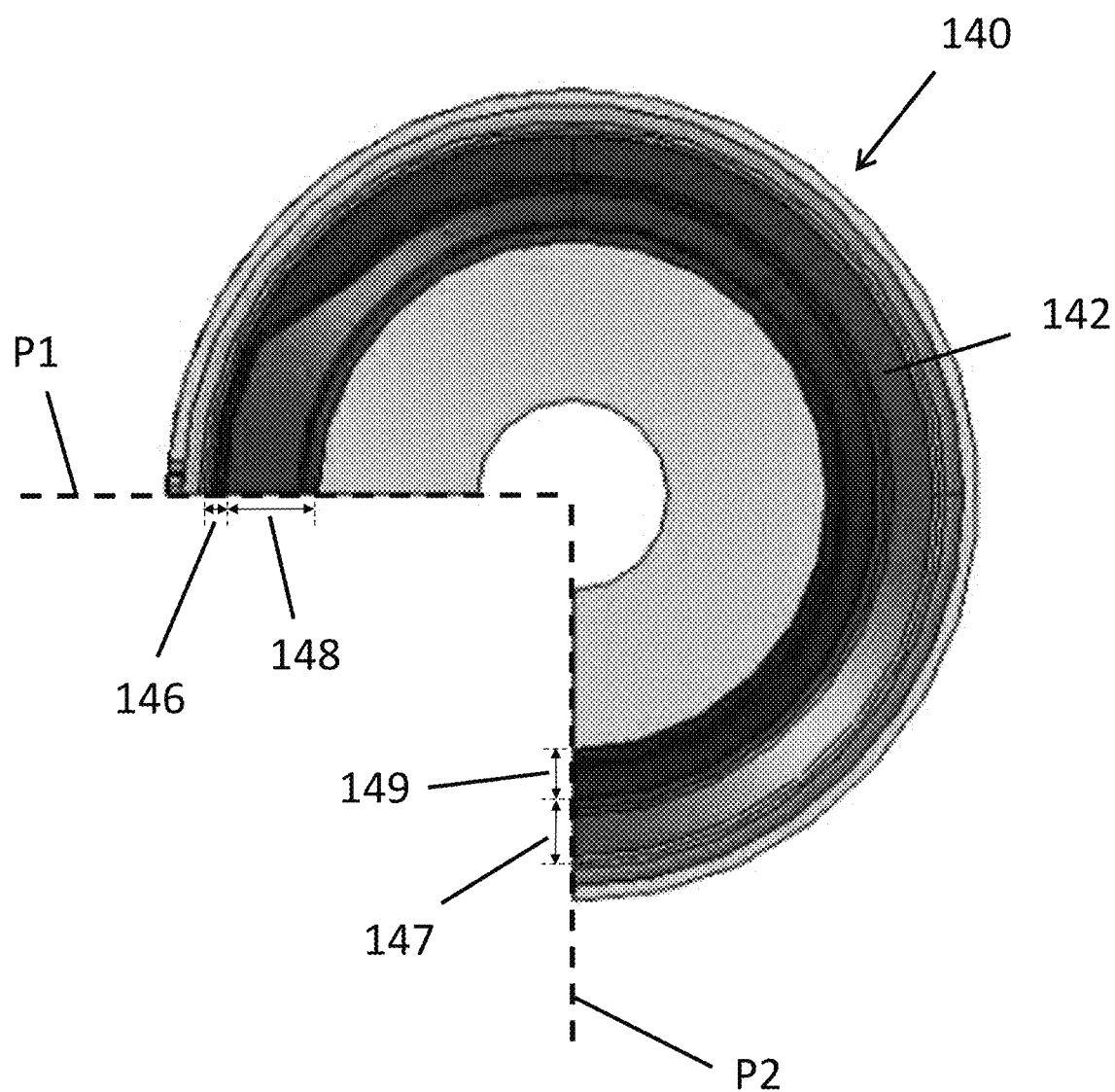
FIG. 8 shows a view in a transverse plane of the ring press-fit onto the first sleeve according to the half section of FIG. 5.

FIG. 8 shows a view in a transverse plane of the ring press-fitted over the first sleeve according to the half section of FIG. 5. The elastic inner liner 142 of the ring 140 has a radial section of varying shape. The Figure illustrates that the elastic inner liner may have a variable thickness. The elastic inner lining 142 has a first radial thickness 146 along the first plane P1 of the half section and a second radial thickness 147, greater than the first, along the second plane P2 of the half section. This difference in radial thickness makes a greater space for the ring 140 in the radial direction of the first plane P1 than that in the radial direction of the second plane P2. The two different sections of the inner liner thus make it possible to adjust of the damping in these two radial directions. In other examples, the variable section of the elastic inner liner 142 may be different and make other damping curves possible in the radial direction.

Figure 10:
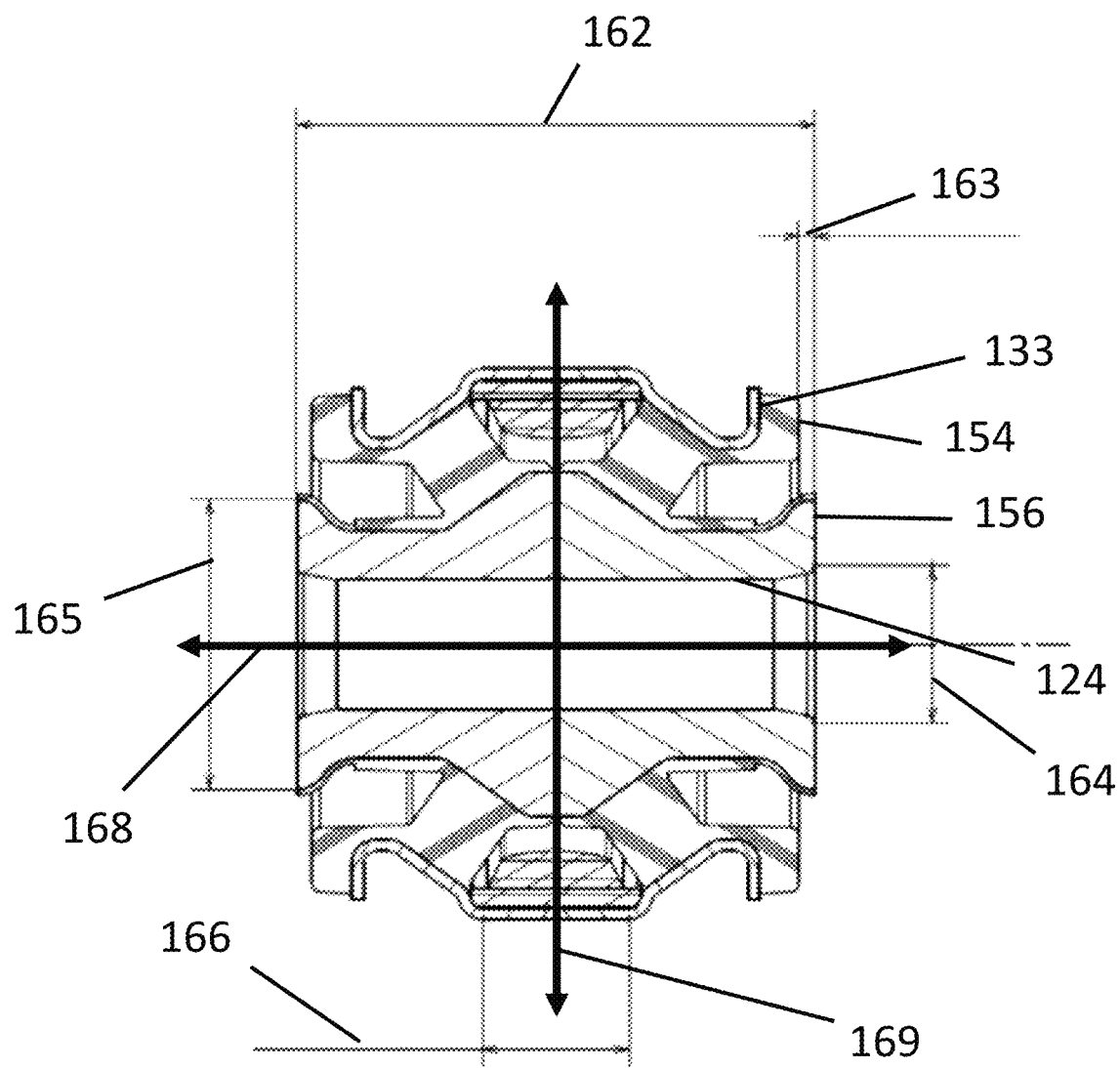
FIG. 10 shows a view in an axial section of the elastic articulation of FIG. 1 according to the section A-A shown in FIG. 9.
Figure 11:
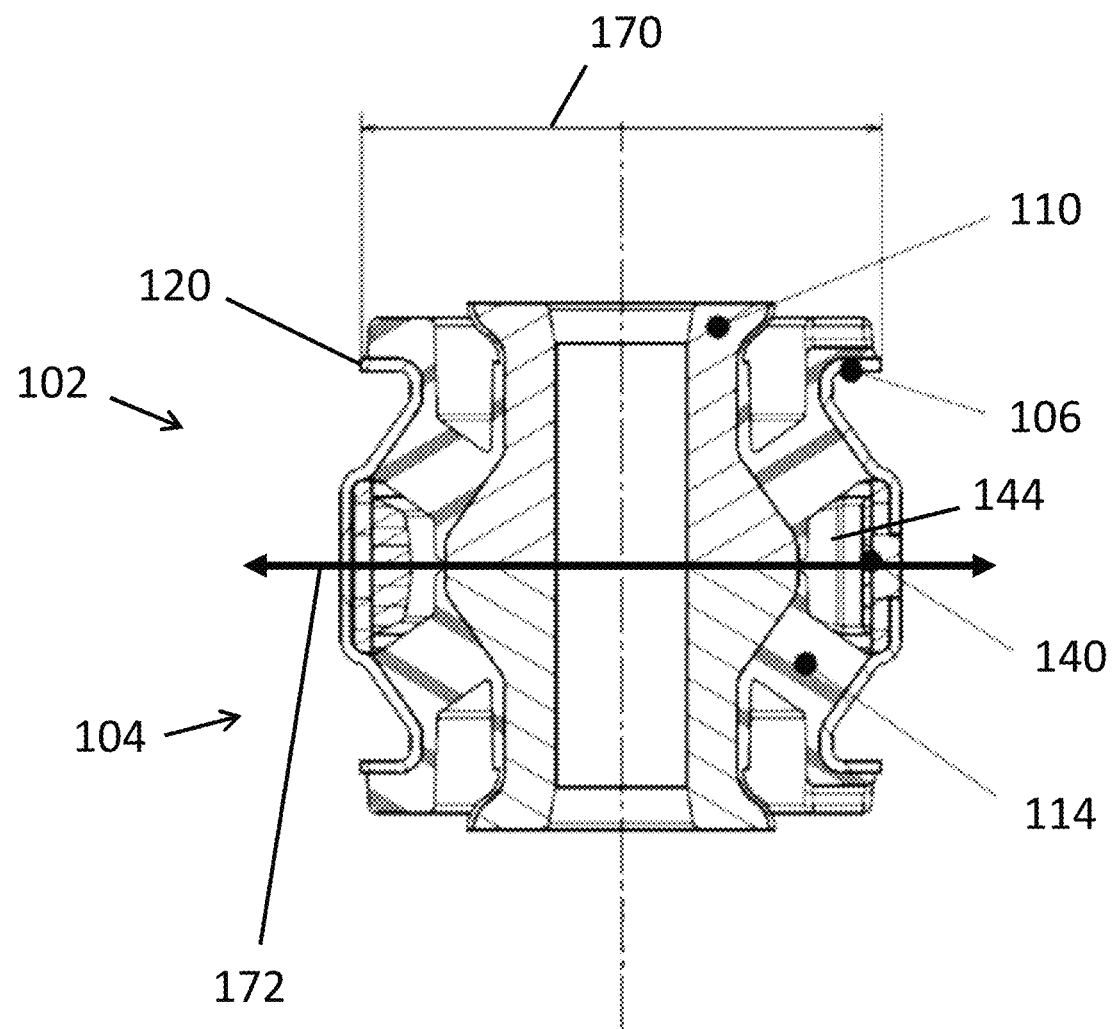
FIG. 11 shows a view in an axial section of the elastic articulation of FIG. 1 according to section B-B shown in FIG. 9.

Examples dimensions of parts will now be discussed with reference to FIGS. 9 through 11, by way of example and not in an exhaustive manner.

Figure 9:
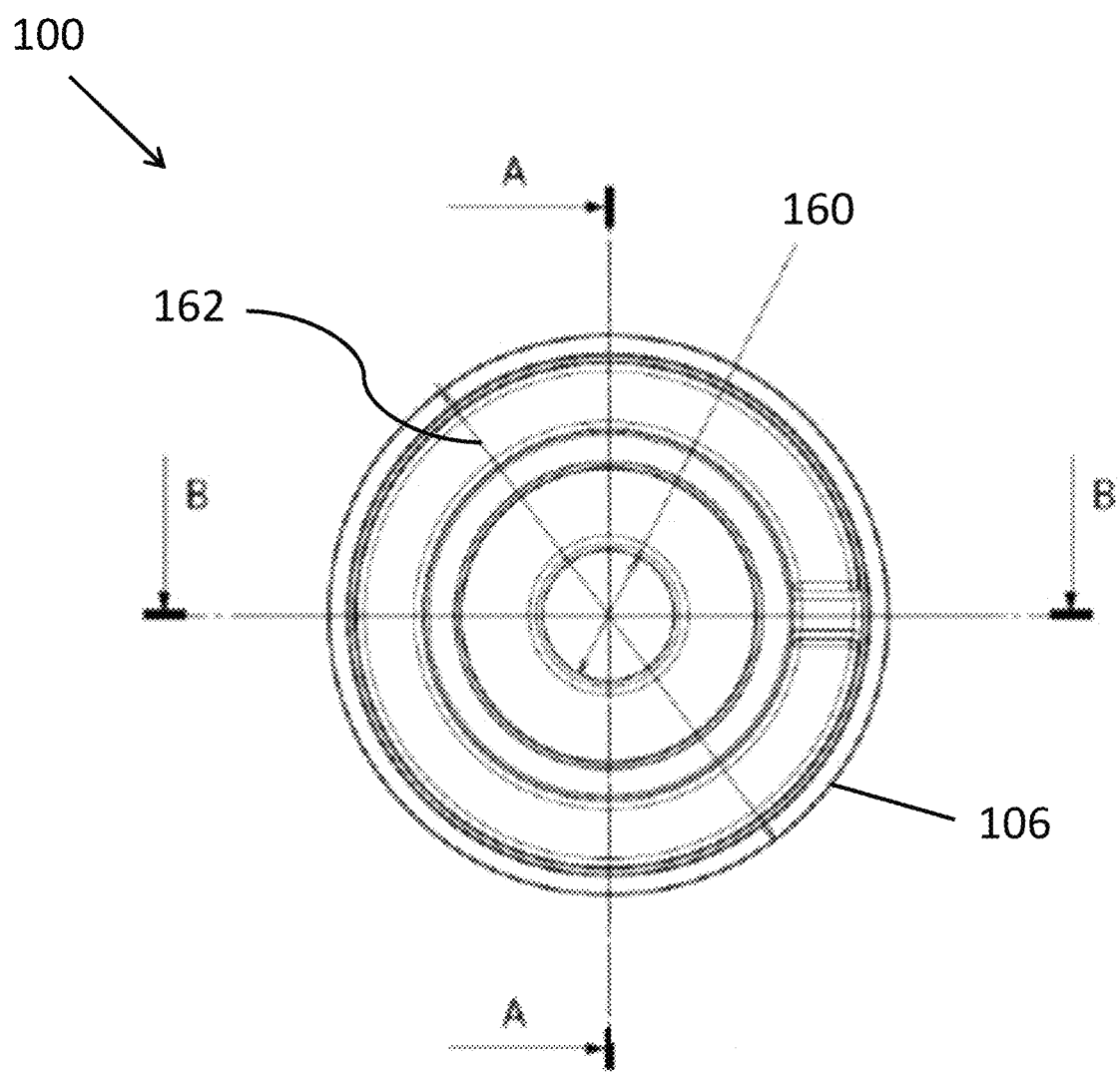
FIG. 9 shows a schematic view in a transverse plane of the elastic articulation of FIG. 1.

FIG. 9 shows a schematic view in a transverse plane of the elastic articulation 100 of FIG. 1. FIG. 10 shows a view in an axial section of the elastic articulation 100 of FIG. 1 along the section A-A shown in FIG. 9. FIG. 11 shows view in an axial section of the elastic articulation 100 of FIG. 1 according to section B-B shown in FIG. 9.

The diameter 160 of the inner surface 124 of circular inner section of the inner armature 110 is 16.5 mm, with a tolerance of 0.5 mm. The diameter 162 at the end of the outer surface of the outer armature 106 is 70.1 mm, with a tolerance of 0.3 mm.

The total length 162 along the longitudinal axis of the abutting inner armatures is 66 mm, with a tolerance of 0.25 mm. For each sleeve, the elastic body overlaps the end surface 133 so as to create a space 163 of 2 mm with a tolerance of 0.5 mm, along the longitudinal axis and between the top surface 154 of the elastic body and the end surface 156 of the inner armature. The inner surface 124 of the circular inner section is flared at each end of the articulation, and its diameter 164 at each end is 20 mm maximum. The diameter 165 of the flared end of the inner armature of each sleeve is 37 mm, with a tolerance of 2 mm. The total length 166, in the axial direction of the flats of the outer surfaces of the outer armatures, is 18.71 mm. The radial stop makes it possible to control the damping in the stop in a first radial direction 169. The radial stop makes it possible to control movement and progression in this first radial direction 169. The space 163 makes it possible to control damping along the longitudinal axis 168. The space 163 makes it possible to control movement and progression along the longitudinal axis 168.

The diameter 170 of the ring 120 of the outer surface of the outer armature 106 is 65.1 mm, with a tolerance of 0.25 mm. The radial stop makes it possible to control the damping at the stop in a second radial direction 172. The radial stop makes it possible to control movement and progression in this second radial direction 172. The elastic articulation thus makes it possible to control in two radial directions and in the longitudinal axis. Around the origin, there is no contact or friction, and only the elastic body works.

FIGS. 12-15 show an elastic articulation 200 according to another embodiment. This elastic articulation 200 differs from the articulation 100 of FIGS. 1-11, in particular in that the ring 240 comprises alveoli 280, 281 and 282.

Figure 12:
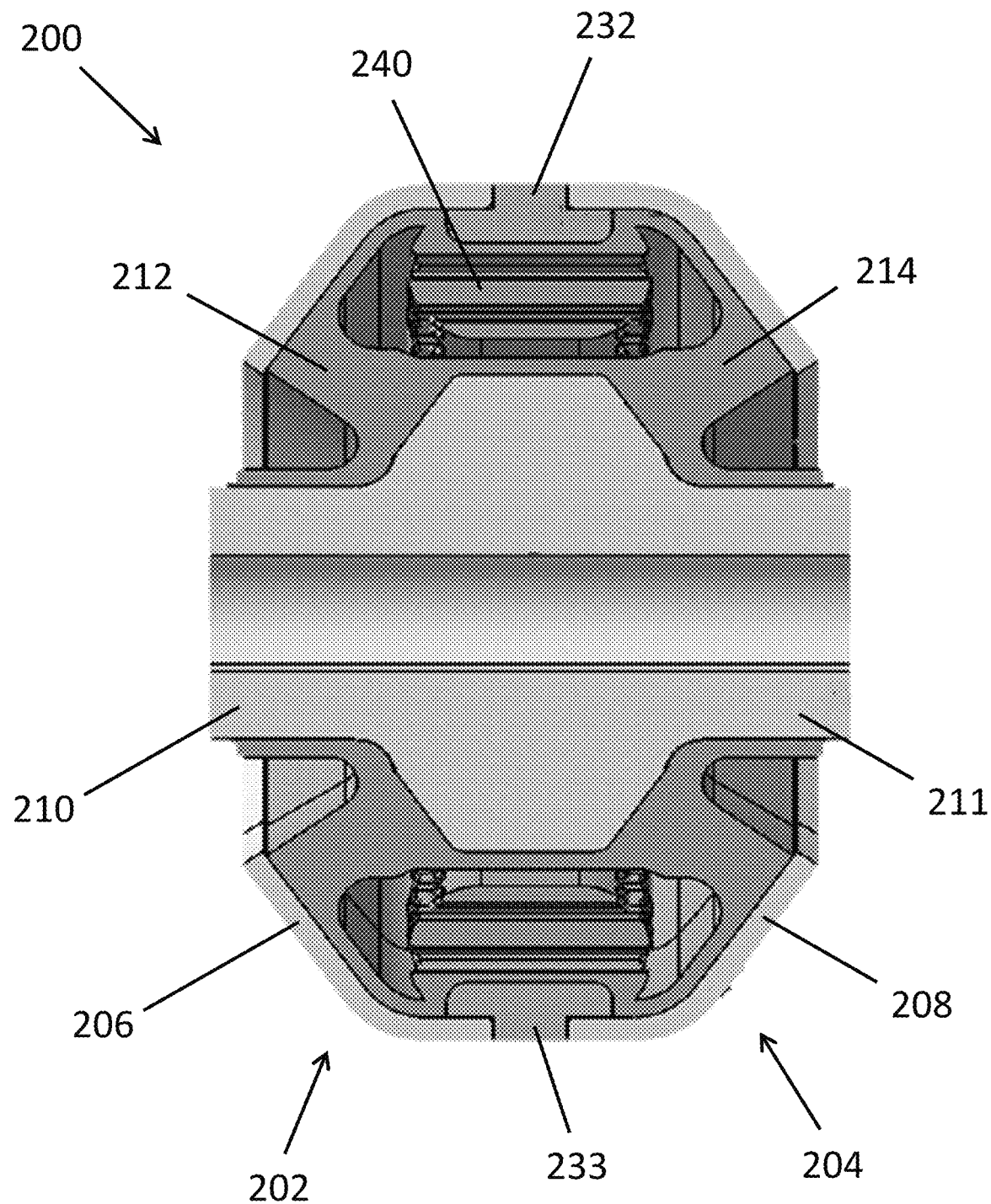
FIG. 12 shows another example of an elastic articulation.

As shown in FIG. 12, the elastic articulation 200 comprises a first sleeve 202 and a second sleeve 204. The first sleeve 202 and the second sleeve 204 each include a respective outer armature 206, 208, a respective inner armature 210, 211, and a respective elastic body 212, 214 between their respective outer armature and inner armature. The elastic articulation 200 comprises two radial position markers 232 and 233. The inner armatures 210, 211 may be made of aluminum or steel. The outer armatures 206, 208 may be made of steel. The elastic articulation 200 also comprises a ring 240 longitudinally connecting the first sleeve 206 and the second sleeve 208. The ring 240 between the inner armature 210 and the outer armature 206 of the first sleeve 202, and between the inner armature 211 and the outer armature 208 of the second sleeve 204. The ring 240 is thus integrated within the articulation, which improves damping control.

Figure 13:
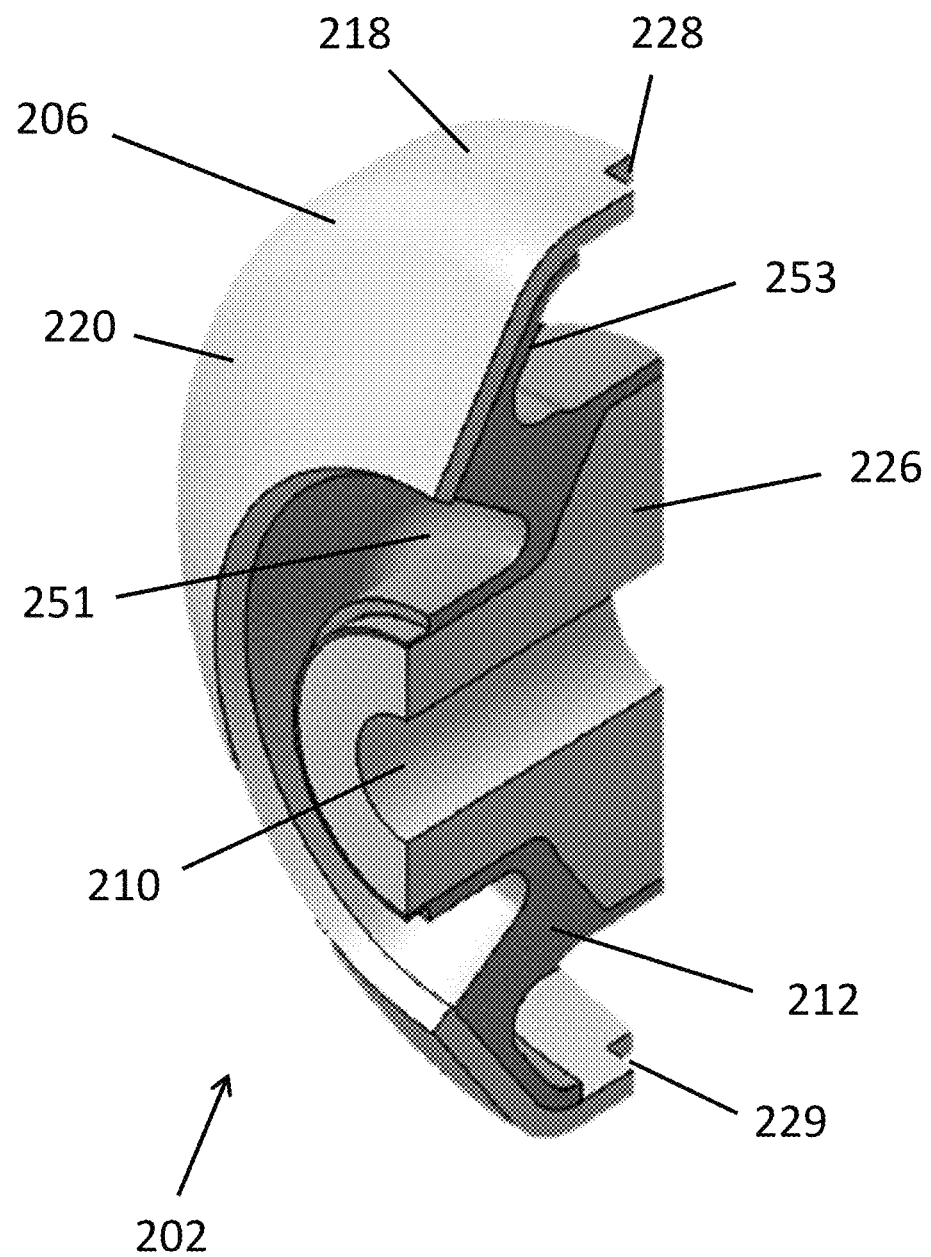
FIG. 13 shows the first sleeve of the elastic articulation of FIG. 12.

FIG. 13 shows the first sleeve 202 of the elastic articulation 200 of FIG. 12. The outer surface of the outer armature 206 comprises a plate 218 and a tapered portion 220. The outer armature 206 comprises a first notch 228 and a second notch 229. The elastic body 212 comprises a first cavity 251 at a first end of the articulation and a second cavity 253 at the connection with the second sleeve 204. An end 226 of the inner armature 210 at the connection with the second sleeve 204 is flared.

Figure 14:
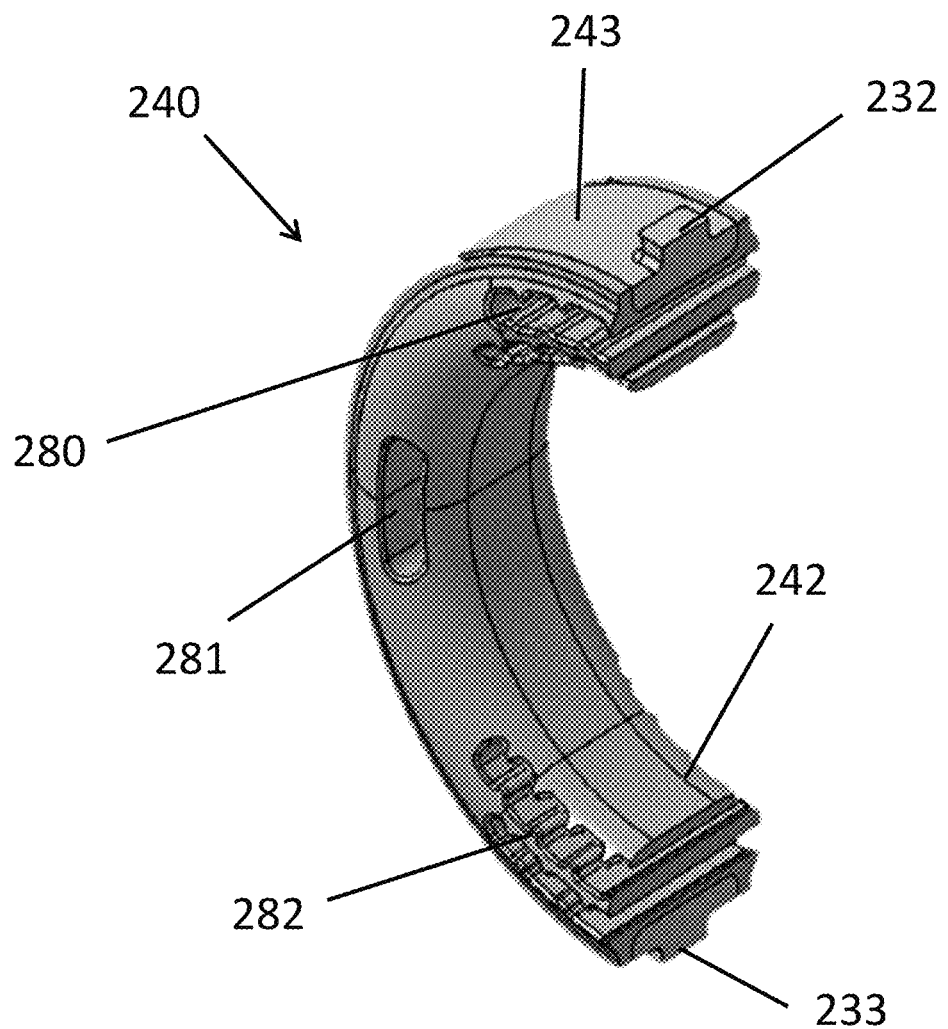
FIG. 14 shows the ring of the elastic articulation of FIG. 12.

FIG. 14 shows the ring 240 of the elastic articulation 200 of FIG. 12 and highlights the alveoli 280, 281, and 282. The ring 240 comprises an elastic inner liner 242. The elastic inner liner 242 may be made of a rubber material. The ring 240 comprises an outer wall 243 of rigid material. The outer wall 243 may be made of a plastic or metallic material. The ring 240 comprises a first radial outer protrusion 232 engaging the first notch 228 of the outer armature 206 of the first sleeve 202 and a first notch of the outer armature 208 of the second sleeve 204. The ring 240 comprises a second radial outer protrusion 233, engaging the second notch 229 of the outer armature 206 of the first sleeve 202 and a second notch of the outer armature 208 of the second sleeve 204. The elastic inner liner 242 has a radial section of varying shape.

The elastic inner liner 242 comprises a plurality of alveoli: one isolated alveolus 281 and grouped alveoli 280, 282. The alveoli 280, 282 are distributed in two rows aligned along the radial direction. The alveoli 280, 281 and 282 make it possible to adjust the elasticity of the liner 242, so as to modify locally (that is, where the alveoli are formed) the behavior of the ring 240 in terms of radial vibration damping. The alveoli thus provide an additional variable to control the damping curve. This makes fine damping possible, even if the liner 242 is simply made of a homogeneous material (and thus has constant local elasticity).

Figure 15:
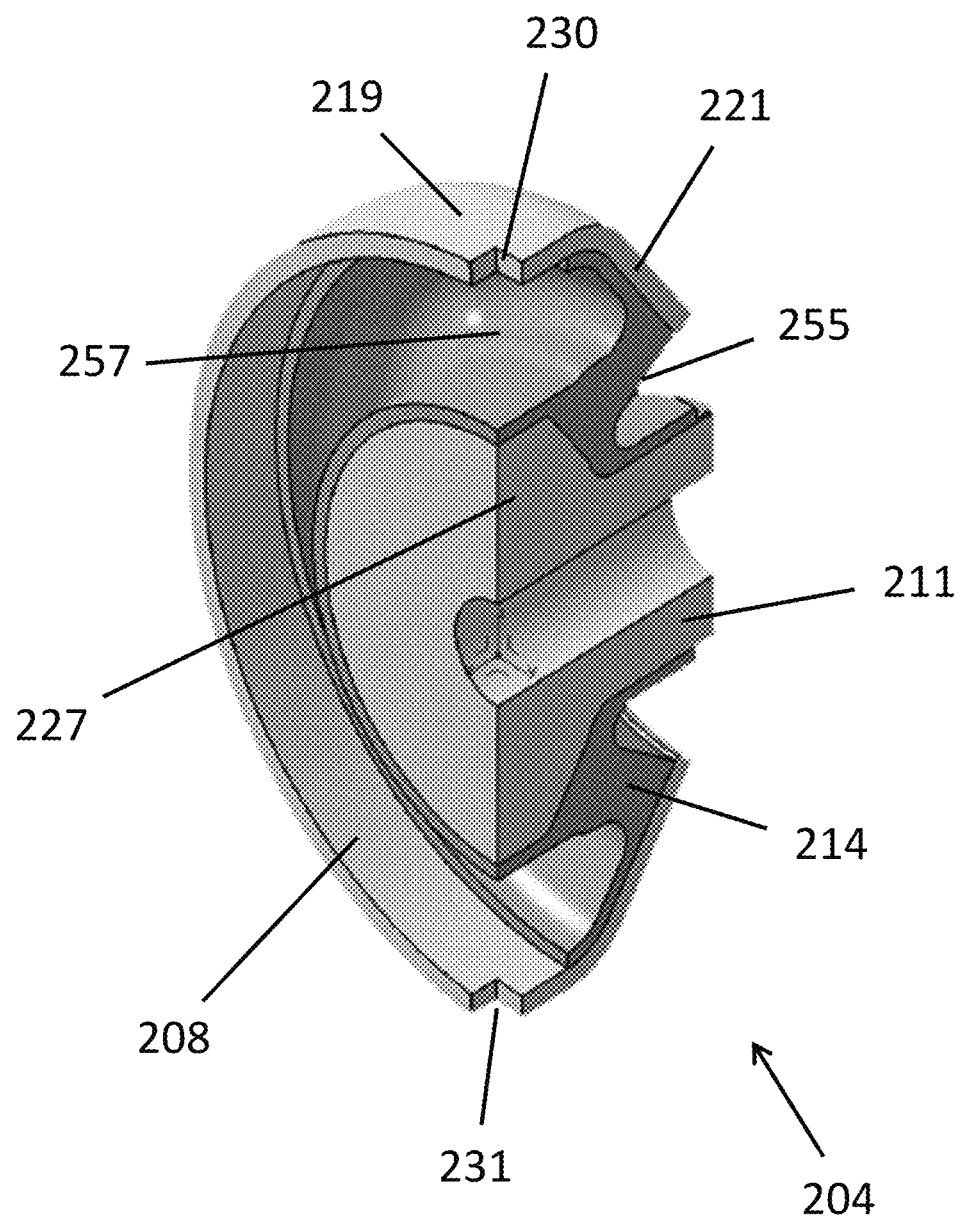
FIG. 15 shows the second sleeve of the elastic articulation of FIG. 12.

FIG. 15 shows the second sleeve 204 of the elastic articulation 200 of FIG. 12. The second sleeve 204 comprises the outer armature 208, the inner armature 211, and the elastic body 214. The outer armature 208, inner armature 211 and elastic body 214 of the second sleeve are identical to the outer armature, inner armature and elastic body of the first sleeve. The outer surface of the outer armature 208 comprises a plate 219 and a tapered portion 221. The outer armature 206 of the first sleeve 102 also comprises a first notch 230 and a second notch 231. The elastic body 214 comprises a first cavity 255 at a first end of the articulation and a second cavity 257 at the connection to the first sleeve 202.

Figure 16:
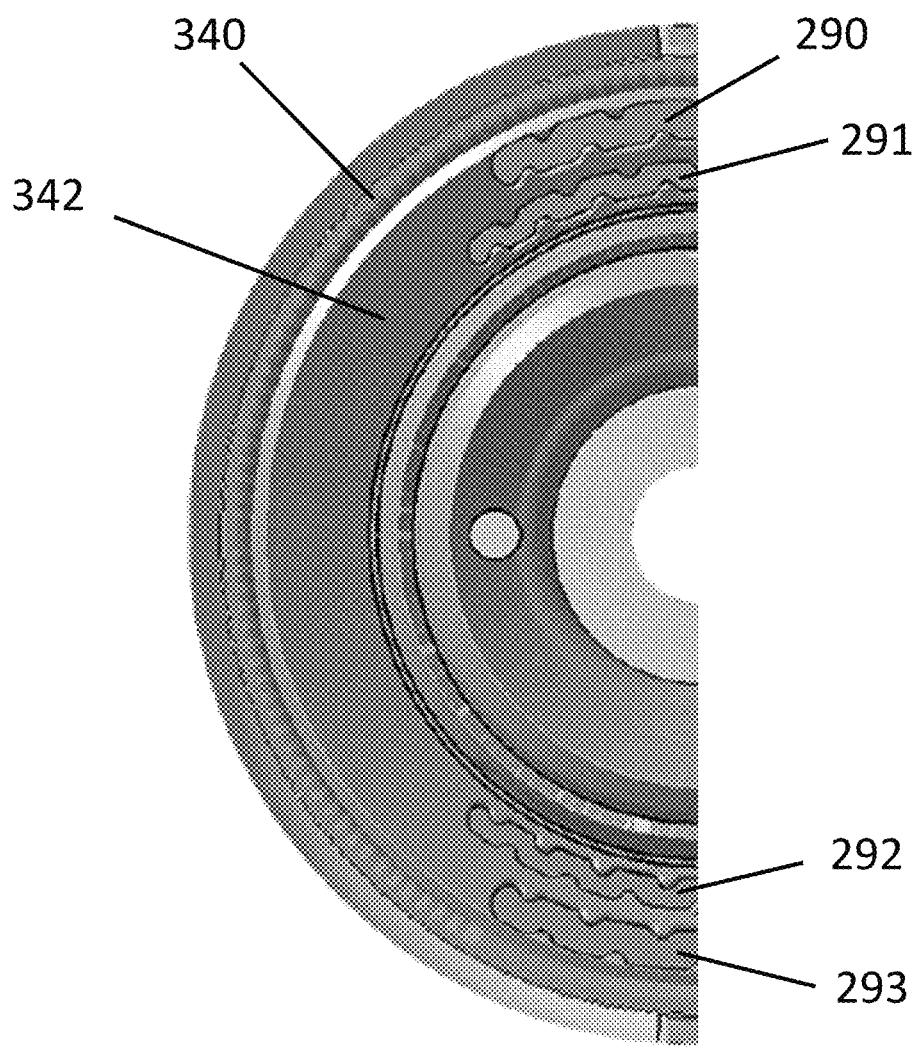
FIG. 16 shows a ring comprising alveoli that differ from those of the ring of FIG. 14.

FIG. 16 shows a ring 340 comprising alveoli that differ from the ring 240 of FIG. 14 in that the ring 340 does not comprise an isolated cavity, in particular isolated cavity 281. The elastic inner liner 342 comprises alveoli 290, 291, 292, 293. The elastic inner liner 242 comprises the first group of alveoli 290, 291 and the second group of alveoli 292, 293. Each group of alveoli is distributed in two rows aligned in the radial direction. The alveoli cause differences in damping rigidity in different radial directions. In particular, in this example, the damping rigidity in a first radial direction in which the alveoli are located is lower than in the other radial directions, with this lower rigidity caused by the groups of alveoli. The alveoli thus make it possible to control the progression of the vibration movements over a certain range, such as a range of 10 mm.

Compared to the ring 240 in FIG. 14, the ring 340 does not comprise the isolated alveolus 281, which causes a higher rigidity in a second radial direction perpendicular to the first for the ring 340 than for the ring 240. The alveoli thus make fine and precise damping control possible of in different radial directions, and thus improve the damping control of vibration movements of the elastic articulation.

What is claimed is:

1. An elastic articulation comprising:
    a first sleeve and a second sleeve, the first sleeve and the second sleeve each comprising an outer armature, an inner armature and an elastic body between the outer armature and the inner armature; and
    a ring longitudinally connecting the first sleeve and the second sleeve, the ring forming a radial stop between the inner and outer armatures of the first sleeve, and between the inner and outer armatures of the second sleeve.

2. The elastic articulation according to claim 1, wherein the outer armature of the first sleeve and the outer armature of the second sleeve are press-fitted over the ring and on either side of the ring.

3. The elastic articulation according to claim 1, wherein the ring comprises an elastic inner lining.

4. The elastic articulation according to claim 3, wherein the elastic inner lining has a radial section of variable shape.

5. The elastic articulation according to claim 4, wherein the elastic inner lining has a variable thickness.

6. The elastic articulation according to claim 4, wherein the elastic inner lining comprises one or more alveoli.

7. The elastic articulation according to claim 4, further comprising a radial position marker.

8. The elastic articulation according to claim 3, wherein the elastic body of the first sleeve and the elastic body of the second sleeve on the one hand, and the elastic inner lining on the other hand, have different rigidities.

9. The elastic articulation according to claim 1, wherein the outer armature of the first sleeve comprises a notch and/or the outer armature of the second sleeve comprises a notch.

10. The elastic articulation of claim 9, wherein the ring comprises a radial outer protrusion engaging the notch of the outer armature of the first sleeve and/or the notch of the outer armature of the second sleeve.

11. The elastic articulation according to claim 1, wherein the ring comprises an outer wall of rigid material.

* * * * *